United States Patent [19]

Greinke et al.

[11] Patent Number: 5,376,450

[45] Date of Patent: Dec. 27, 1994

[54] LOW SURFACE ACID INTERCALATED GRAPHITE AND METHOD

[75] Inventors: Ronald A. Greinke, Medina; Richard I. Bretz, Parma, both of Ohio

[73] Assignee: UCAR Carbon Technology Corporation, Danbury, Conn.

[21] Appl. No.: 953,293

[22] Filed: Sep. 30, 1992

Related U.S. Application Data

[63] Continuation of Ser. No. 720,397, Jun. 25, 1991, abandoned.

[51] Int. Cl.$^5$ .................................. B32B 5/16
[52] U.S. Cl. ............................ 428/402; 252/502; 252/506; 423/448; 423/460; 428/403; 428/408
[58] Field of Search .................. 428/402, 408, 403; 423/448, 460; 252/506, 502

[56] References Cited

U.S. PATENT DOCUMENTS

| | | | |
|---|---|---|---|
| 3,404,061 | 10/1968 | Shane et al. | 428/143 |
| 3,536,512 | 10/1970 | Derry, Jr | 423/460 |
| 3,932,596 | 1/1976 | Rohatgi | 423/448 |
| 4,146,401 | 3/1979 | Yamada et al. | 423/460 |
| 4,555,393 | 11/1985 | Sorensen et al. | 423/460 |
| 4,608,192 | 8/1986 | Su | 252/506 |
| 4,642,201 | 2/1987 | Vogel | 252/503 |
| 4,722,945 | 2/1988 | Wood et al. | 521/65 |

*Primary Examiner*—D. S. Nakarani
*Attorney, Agent, or Firm*—F. J. McCarthy

[57] ABSTRACT

Particles of intercalated graphite are formed by treating graphite particles with an intercalant and contacting the graphite particles with an organic molecule having $C_8$–$C_{30}$ carbon atoms and a polar end functional group.

7 Claims, No Drawings

LOW SURFACE ACID INTERCALATED GRAPHITE AND METHOD

This application is a continuation of prior U.S. application Ser. No. 07/720,397 filing date Jun. 25, 1991, now abandoned.

FIELD OF THE INVENTION

This invention relates to a method for forming particles of intercalated graphite and to particles of intercalated graphite having a low concentration of surface acids.

BACKGROUND OF THE INVENTION

Graphite is a crystalline form of carbon comprising atoms bonded in flat layered planes with weaker bonds between the planes. By treating particles of graphite, such as natural graphite flake, with an intercalant of, e.g., a solution of sulfuric and nitric acid., the crystal structure of the graphite reacts to form a compound of graphite and the intercalant. The treated particles of graphite are hereafter referred to as "particles of intercalated graphite". Upon exposure to high temperature, the particles of intercalated graphite expand in dimension as much as 80 or more times its original volume in an accordian-like fashion in the c-direction, i.e. in the direction perpendicular to the crystalline planes of the graphite.

Particles of intercalated graphite have many useful applications. The most common application is to exfoliate the intercalated graphite particles into vermicular like structures which are then compressed into sheets of flexible graphite for use in the manufacture of gaskets or as packing material. Particles of intercalated graphite may also be used in their unexpanded state to form a variety of products which take advantage of the high expansion characteristic of the particles of intercalated graphite when exposed to high temperature. One such example is for use in combination with polymer foams to form seat cushions and furniture upholstery in aircraft. Upon exposure to fire, the high temperature will cause the particles of intercalated graphite to exfoliate which minimizes or prevents the formation of toxic gases from the polymer foam and may, of itself, smother a fire. Despite its apparent advantages, commercial use has been limited due to the high concentration of titratable surface acids present on the particles of intercalated graphite. An average of about 4% surface acids by weight have been calculated as being present on commercially available particles of intercalated graphite. This is considered to be much too high in concentration for many of the above suggested uses. A high concentration of titratable surface acids is objectionable for the following reasons: (a) it gives off a disagreeable odor, (b) its volumetric expansion capability is reduced with age and (c) surface acids will interact chemically with polymer foam catalysts and interfere with the desired foaming action.

Considerable effort has been undertaken to minimize the concentration of surface acids present on particles of intercalated graphite with minimal success. Most of this effort was based on the premise that the concentration of surface acid could be controlled by proper washing of the intercalated flakes in water. In fact, many investigators have concluded that a relatively high concentration of surface acids is inherent to the process of intercalation and cannot be effectively eliminated without seriously impairing the volumetric expansion capability of the intercalated particles. It has been discovered in accordance with the present invention that particles of intercalated graphite may be formed with a very low concentration of titratable surface acid and a volumetric expansion of over 150 cc/g, independent of the method of washing and drying.

SUMMARY OF THE INVENTION

The method of the present invention for forming particles of intercalated graphite comprises the steps of:
(a) treating particles of graphite with an intercalant comprising a solution of one or more members selected from the group consisting of nitric acid, sulfuric acid, potassium chlorate, chromic acid, potassium permanganate, potassium chromate, potassium dichromate, perchloric acid, hydrogen peroxide, iodic acid, periodic acid, ferric chloride and other metal halides; and
(b) contacting said particles either before, during or after said intercalation treatment in step (a) with an agent composed of an organic molecule having a long chain hydrocarbon group with at least eight carbon atoms and a polar functional end group.

Particles of intercalated graphite having an average titratable surface acid concentration of no more than 1.5% by weight and preferably below 0.5% by weight and a specific worm volume of at least about 150 cc/g when exfoliated at high temperature are formed by the process of treating particles of natural or synthetic graphite with an intercalant and contacting the graphite particles either before, during or after the intercalation treatment with an agent composed of an organic molecule having a long chain hydrocarbon group with at least eight carbon atoms and a polar functional end group.

DETAILED DESCRIPTION OF THE INVENTION

Particles of intercalated graphite are conventionally formed by treating particles of natural or synthetic graphite with agents that intercalate into the crystal structure of the graphite to form a compound of graphite and the intercalant capable of expansion in the c-direction, i.e. the direction perpendicular to the crystalline planes of the graphite, when heated to a high temperature of above 700° C. and preferably above 1000° C. The intercalated graphite particles are washed and dried prior to exfoliation. Exfoliated graphite particles are vermiform in appearance and are commonly referred to as "worms".

A common method for forming particles of intercalated graphite and for manufacturing sheets of flexible graphite from exfoliated graphite particles is described in U.S. Pat. No. 3,404,061 the disclosure of which is incorporated herein by reference. As disclosed in the above mentioned patent natural graphite flakes are intercalated by dispersing the flakes in a solution containing an oxidizing agent, such as a mixture of nitric and sulfuric acid. After the flakes are intercalated excess solution is drained from the flakes and the flakes are washed and dried. The quantity of intercalation solution retained on the flakes after draining is typically greater than 100 parts of solution by weight per 100 parts by weight of graphite flakes (pph) and more typically about 100 to 150 pph. Alternatively, the quantity of the intercalation solution can be limited to between 10 to 50 parts of solution per hundred parts of graphite by weight (pph). This permits the washing step to be eliminated as taught and described in U.S. Pat. No. 4,895,713 the disclosure of which is herein incorporated by reference.

The intercalant of the present invention contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In the preferred embodiment of the invention, the intercalant is a solution of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalant may contain metal halides such as ferric chloride, and ferric chloride mixed with sulfuric acid, or a halogen, such as bromine as a solution of bromine and sulfuric acid or bromine in an organic solvent.

In accordance with the present invention the particles of graphite treated with an intercalant should be contacted with an organic agent composed of a long chain hydrocarbon group having at least eight carbon atoms and a polar functional end group. The organic agent is preferably a surfactant having a molecular structure with a hydrophobic long chain hydrocarbon group of at least eight but preferably ten or more carbon atoms and a polar functional end group which can be anionic, cationic, zwitterionic or nonionic. Broadly, the long chain hydrocarbon group can contain olefin bonds and can be a straight or branched chain molecule having between $C_{10}$–$C_{30}$ atoms and a polar end group with the surfactant having the generic formula R(X), where R is the hydrocarbon group and X is the polar end functional group comprising at least one of —COOZ, phosphate,

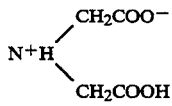

and OH and where Z is H, an alkyl group having 1 to 6 carbon atoms, an alkali metal or $NH^+_4$.

It is postulated that the high levels of surface acid remaining on conventional intercalated graphite result from drying the graphite flakes after they have been washed with water. The washing step closes and seals the edges of the graphite flakes. However, the drying operation wrinkles, distorts, and ultimately reopens the edges of the graphite layer planes of the intercalated flakes to expose the acid intercalant inside the graphene gallery.

In accordance with the present invention it has been shown that the addition of an organic surfactant, with a long aliphatic tail and a polar functional end group readily reduces the titratable surface acids present on the dried intercalated flake. The surfactant is believed to relieve the stress on the edges of the intercalated graphite flake during drying, which prevents the wrinkling, distorting and reopening of the edges of the graphite layer planes and which in turn prevents the subsequent exposure of the gallery acids. The surfactant may be added to the starting graphite flake or during the step of intercalation or in combination with the washing operation or after the washing operation. The organic surfactant may be introduced as a liquid or solid which is insoluble in water. Addition of the surfactant to the intercalated wet flake is preferred. The amount of surfactant needed to reduce the presence of surface acids is minimal since it need only be in contact with the surface of the particles during the drying operation. The minimum required concentration of surfactant to reduce the residual content of surface acids below about 1.5% varies from between about 0.35 pph and 1.0 pph depending upon the selected surfactant and the intercalant.

The generally accepted procedure for intercalating the graphite flake, measuring the surface acid concentration present on the graphite flake after washing and drying and measuring the specific worm volume is described below:

A. Laboratory Intercalation Procedure
1. Weigh out e.g. 15 g of the raw flakes in a 250 ml beaker.
2. Add 12 g of a 92% $H_2SO_4$/8% $HNO_3$ intercalant. (The sulfuric acid for the above solution is 93% strength and tile nitric acid is 67% strength. The amount of acid added is 80 pph.)
3. Blend tile acid and flakes until uniform.
4. Wash the flakes with water and filter to remove fine graphite and ash particles.
5. Dry the washed flakes.

B. Titration of the Intercalated and Dried Graphite Flakes
1. Weigh out 1.00 g of the flakes to be titrated.
2. Place the flakes in a 140 ml beaker containing a magnetic stir bar.
3. Add 30 ml of $H_2O$ and four to five drops of a phenolphthalein solution (0.1 g in 100 ml of ethanol).
4. Titrate to a pink endpoint with 0.1N NaOH. The stirrer is used only after an addition of the NaOH. The agitated flakes mask the pink endpoint.
5. Surface acid calculation (for the 1.0 g sample): % by weight acid (calculated as $H_2SO_4$)=4.904×-normality of base×ml of base.

C. Measurement of Specific Worm Volume (Exfoliation Volume)
1. A porcelain crucible is placed on a ring stand above a Bunsen burner and heated until it is white hot.
2. With a spatula, a small amount of the intercalated and dried flakes are placed into the hot crucible.
3. When the flakes are all expanded, the worms are poured from the crucible into a volumetric type of flask or beaker.
4. Steps 2 and 3 are repeated until the volumetric container is filled. The specific worm volume is determined by dividing the volume of the worms in the volumetric container by the weight of the worms.

A surfactant is preferably added to the intercalated-wet flake as follows:
1. Add the desired surfactant to the intercalated flakes that were washed in paragraph 4 of the intercalation procedure set forth in the above labeled "Section A".
2. Mix the surfactant into the wet flakes as uniformly as possible.
3. Dry the flakes on a hot plate with a surface temperature of between 100° C. and 170° C. and stir occasionally during drying to mix in the surfactant.

EXAMPLES

The following examples are illustrative of the invention. The "A" designated graphite flakes contain less than 1% ash and the "C" designated graphite flakes contain more than 5% ash.

(1) Comparative—80 pph of intercalant consisting of 92% sulfuric acid and 8% nitric acid were added to an "A" flake. After washing, filtering and drying of this intercalated flake, the measured surface acid concentration was 6.6%. No surfactant was added.

(2) Comparative example (1) was repeated. The surface acids titrated were 4.36% and the worm volume was 260 cc/g.

(3) One pph of methyl stearate was added to an "A" flake. 80 pph of intercalant consisting of 92% sulfuric acid and 8% nitric acid were added to the mixture. After washing, filtering and drying of this intercalated flake, the surface acids titrated were only 0.15%.

(4) This example is identical to Example (3) except that 0.5 pph of methyl stearate was added to the "A" flake. The surface acids titrated were only 0.12% and the worm volume was 230 cc/g.

(5) This example is identical to Example (3) except that 0.25 pph of methyl stearate was added to the "A" flake. The surface acids titrated were 1.51% and the worm volume was 170 cc/g.

(6) This example is identical to Example (3) except that 1 pph of rubber grade stearic acid (a mixture of mostly palmitic acid and stearic acid) was added to the "A" flake as the surfactant. The surface acids titrated were only 0.19% and the worm volume was 150 cc/g.

(7) This example is an identical repeat of Example (6). The surface acids titrated were only 0.24% and the worm volume was 260 cc/g.

(8) This example is identical to Example (3) except that 1 pph of palmitic acid was added to the "A" flake instead of methyl stearate. The surface acids titrated were only 0.58% and the worm volume was 250 cc/g.

(9) This example is identical to Example (3) except that 1 pph of margaric acid was added to the "A" flake as the surfactant. The surface acids titrated were only 0.19% and the worm volume was 240 cc/g.

(10) This example is identical to Example (3) except that 1 pph of nonadecanoic acid was added to the "A" flake as the surfactant. The surface acids titrated were only 0.34% and the worm volume was 300 cc/g.

(11) This example is identical to Example (3) except that 1 pph of arachidic acid was added to the "A" flake a the surfactant. The surface acids titrated were only 0.10% and that worm volume was 275 cc/g.

(12) This example is identical to Example (3) except that 1 pph of oleic acid was added to the "A" flake as the surfactant. The surface acids titrated were only 0.24% and the worm volume was 250 cc/g.

(13) This example is identical to Example (3) except that 1 pph of linoleic acid was added to the "A" flake as the surfactant. The surface acids titrated were only 0.53% and the worm volume was 240 cc/g.

(14) Comparative—This example is identical to Example (3) except that 1 pph of phthalic acid was added to the "A" flake as the surfactant. The surface acids titrated were 4.42% and the worm volume was 150 cc/g. The surface acids were not reduced because the structure of the additive does not contain a long aliphatic tail.

(15) This example is identical to Example (3) except that 1 pph of 1-dodecanol was added to the "A" flake as the surfactant. The surface acids titrated were only 0.29% and the worm volume was 270 cc/g. This alcohol molecule has the shape of a surfactant with a polar functional end group and a long chain hydrocarbon group.

(16) Comparative—This example is identical to Example (3) except that 1 pph of n-octadecane was added to the "A" flake as the surfactant. The surface acids titrated were 5.35% and the worm volume was 160 cc/g. This additive was not effective in reducing surface acids since long chain alkane molecules do not have a polar functional end group.

(17) Comparative—This example is identical to Example (3) except that 1 pph of n-dodecane was added to the Superior "A" flake as the surfactant. The surface acids titrated were 5.25% and the worm volume was 235 cc/g. This additive was not effective in reducing surface acids since long chain alkane molecules do not have a polar functional end group.

(18) Comparative—This example is identical to Example (3) except that 1 pph of 3,3,5-trimethylcyclohexanol was added to the "A" flake as the surfactant. The surface acids titrated were 5.20%. This alcohol does not have a long chain hydrocarbon group.

(19) Comparative—This is identical to Example (3) except that 1 pph of caproic acid was added to the "A" flake. The surface acids titrated were 5.44%. This fatty acid was ineffective since the hydrocarbon group was too short.

(20) Comparative—This example is identical to Example (3) except that 1 pph of polyethylene glycol was added to the "A" flake as the surfactant. The surface acids titrated were 3.11%. This glycol was ineffective since it does not have the molecular structure of a surfactant.

(21) This example is identical to Example (3) except that 1 pph of stearic acid was added to the "A" flake as the surfactant. The surface acids titrated were only 0.24% and the worm volume was 250 cc/g.

(22) In this case, the organic additive was added to the wet intercalated flake after the washing step. An "A" graphite flake was intercalated with 80 pph of intercalant consisting of 92% by weight of sulfuric acid and 8% by weight of nitric acid. After washing with water, 1 pph of rubber grade stearic acid was added to the wet flake. After drying the mixture on a hot plate, the surface acids titrated were only 0.25% and the worm volume was 330 cc/g.

(23) This example is identical to Example (22) except that 1 pph of isodecyl diphenyl phosphate was added to the wet intercalated "A" flake as the surfactant. The surface acids titrated after drying were only 0.44% and the worm volume was 240 cc/g. This molecule has a long chain hydrocarbon group and a polar end functional group and was effective in reducing the surface acids. Because of the phosphorus present in the flake, the resulting flexible graphite had significantly lower oxidation rates and reduced stainless steel corrosion. Accordingly, this additive provides more than one benefit.

(24) This example is identical to Example (22) except that 1 pph of hexadecyl amine was added to the wet intercalated Superior "A" flake as the surfactant. The surface acids titrated after drying were only 0.19% and the worm volume was 205 cc/g. This additive has the essential long chain hydrocarbon group and polar end functional group.

(25) This example is identical to Example (22) except that 1 pph of sodium stearate was added to the wet intercalated "A" flake as the surfactant. The surface acids titrated after drying were only 0.19% and the worm volume was 230 cc/g.

(26) Comparative—In this example, a "C" flake was employed. The "C" flake was intercalated with 80 pph of intercalant consisting of 92% by weight of sulfuric acid and 8% by weight of nitric acid. After washing with water and drying on the hot plate, the surface acids titrated were 3.16% and the worm volume was 160 cc/g. High surface acids were obtained since surfactant was not employed.

(27) The "C" flake was intercalated with 80 pph of intercalant consisting of 92% by weight of sulfuric acid and 8% by weight of nitric acid. After washing with water, 1 pph of rubber grade stearic acid was added to the wet flake. After drying the mixture on a hot plate, the surface acids titrated were only 0.95% and the worm volume was 185 cc/g.

(28) This example is identical to Example (27) except that 1 pph of ivory soap was added to the wet intercalated "C" flake. The surface acids titrated after drying were only 1.16%. The ivory soap contains sodium and potassium salts of palmitic and stearic fatty acids.

(29) This example is identical to Example (27) except that 1 pph of butyl stearate was added to the wet intercalated "C" flake. The surface acids titrated after drying were only 0.97% and the worm volume was 150 cc/g.

(30) Comparative—In this example, "A" flake was employed. The "A" flake was intercalated with 80 pph of intercalant consisting of 92% by weight of sulfuric acid and 8% by weight of nitric acid. After washing with water and drying on the hot plate, the surface acids titrated were 2.46% and the worm volume was 165 cc/g. The surface acids were high since no surfactant was employed in the process.

(31) The "A" flake was intercalated with 80 pph of intercalant consisting of 92% by weight of sulfuric acid and 8% by weight of nitric acid. After washing with water, 1 pph of rubber grade stearic acid was added to the wet flake. After drying the mixture on a hot plate, the surface acids titrated were only 0.25% and the worm volume was 190 cc/g.

(32) Comparative—In this example, "C" flake was employed. The "C" flake was intercalated with 80 pph of intercalant consisting of 92% by weight of sulfuric acid and 8% by weight of nitric acid. After washing with water and drying on the hot plate, the surface acids titrated were 1.41% and the worm volume was 180 cc/g.

(33) The "C" flake was intercalated with 80 pph of intercalant consisting of 92% by weight of sulfuric acid and 8% by weight of nitric acid. After washing with water, 1 pph of rubber grade stearic acid was added to the wet flake. After drying the mixture on a hot plate, the surface acids titrated were only 0.65% and the worm volume was 175 cc/g.

(34) Comparative—In this example, aging studies in air were performed with the intercalated "A" flake. The "A" flake was intercalated with 80 pph of intercalant consisting of 92% by weight of sulfuric acid and 8% by weight of nitric acid. After washing with water and drying on the hot plate, the surface acids titrated were 2.71% and the worm volume was 255 cc/g. However, after 24 days of aging in air, the surface acids increased to 6.20% and the worm volume decreased significantly to 175 cc/g. The aging results showed that these flakes are unstable.

(35) The "A" flake was mixed with 1 pph of rubber grade stearic acid and was intercalated with 80 pph of intercalant consisting of 92% by weight of sulfuric acid and 8% by weight of nitric acid. After washing with water and drying on the hot plate, the surface acids titrated were 1.02% and the worm volume was 265 cc/g. However, after 24 days of aging in air, the surface acids remained constant at 1.11% and the worm volume remained constant at 260 cc/g. The use of the surfactant reduced the surface acids and prevented the degradation of the flake when aged.

(36) Comparative—In this example, aging studies in air were performed with the intercalated "A" flake. The "A" flake was intercalated with 80 pph of intercalant consisting of 92% by weight of sulfuric acid and 8% by weight of nitric acid. After washing with water and drying on the hot plate, the surface acids titrated were 4.1% and the worm volume was 380 cc/g. However, after 31 days of aging in air, the surface acids increased to 9.60% and the worm volume decreased significantly to 160 cc/g. The aging results showed that these flakes are unstable.

(37) The "A" flake was intercalated with 80 pph of intercalant consisting of 92% by weight of sulfuric acid and 8% by weight of nitric acid. After washing with water, 1 pph of rubber grade stearic acid was added to the wet flake. After drying on the hot plate, the surface acids titrated were 0.1% and the worm volume was 340 cc/g. However, after 31 days of aging in air, the surface acids remained constant at 0.1% and the worm volume remained constant at 370 cc/g. The use of the surfactant reduced the surface acids and prevented the degradation of the flake when aged.

(38) In this example, a study of the influence of the addition of the surfactant, rubber grade stearic acid (RGS), on the worm volumes of different sized fractions of "A" flake is presented. The graphite flake was sized using U.S. Standard mesh screens. Each graphite fraction was intercalated with 80 pph of intercalant consisting of 90% by weight of sulfuric acid and 10% by weight of nitric acid. After washing with water, the intercalated graphite flake was split into two portions. One pph of rubber grade stearic acid was added to one portion, while the other portion was not treated with the surfactant. After drying both portions on the hot plate, the surface acids were titrated and the worm volumes measured and the results are shown in the following table.

| U.S. Standard Mesh | Surface Acids, % With RGS | Surface Acids, % Without RGS | Worm Volume With RGS, cc/g | Worm Volume Without RGS, cc/g |
|---|---|---|---|---|
| −60 +70 | 0.25 | 2.01 | 100 | 60 |
| −50 +60 | 0.15 | 2.21 | 115 | 85 |
| −40 +50 | 0.15 | 2.06 | 135 | 110 |
| −30 +40 | 0.15 | 2.71 | 190 | 165 |
| −20 +30 | 0.20 | 2.46 | 185 | 175 |
| −10 +20 | 0.20 | 2.91 | 250 | 220 |

The results of this comparison study show that the addition of the rubber grade stearic acid reduced the surface acids and increased the worm volumes.

(39) Comparative—In this example, the intercalant consisted of sulfuric acid and hydrogen peroxide. Fifteen grams of "A" flake were mixed with 15 ml of sulfuric acid. Then 2 ml of 70% hydrogen peroxide were added to the mixture. After washing, filtering and drying, the surface acids titrated were 4.81%.

(40) This is identical to Example (39) except that 0.5 g of rubber grade stearic acid was added to the washed intercalated flake. The surface acids titrated were only 0.75%.

(41) An "A" graphite flake was intercalated with 80 pph of intercalant consisting of 92% by weight of sulfuric acid and 8% by weight of nitric acid. After washing with water, 1.0 pph of sodium alkyl aryl sulfonate was added to the wet flake. After drying the mixture on a hot plate, the surface acids titrated were only 1.1% and the worm volume was 200 cc/g.

What is claimed:

1. A process for manufacturing particles of intercalated graphite having no greater than about 1.5% average titratable surface acid by weight comprising the steps of
   (a) treating particles of graphite with an intercalant comprising a solution of one or more members selected from the group consisting of nitric acid, sulfuric acid, potassium chlorate, chromic acid, potassium permanganate, potassium chromate, potassium dichromate, perchloric acid, hydrogen peroxide, iodic acid, periodic acid, ferric chloride and other metal halides to provide intercalated particles of graphite having edge separated layer planes with acid intercalant therebetween in graphene galleries;
   (b) washing said intercalated particles of graphite with water to substantially close the edges of said layer planes and remove exposed surface acid therefrom;
   (c) drying said washed particles; and
   (d) contacting said particles of graphite before said drying step with an effective amount of an agent composed of an organic molecule having a long chain hydrocarbon group with at least eight carbon atoms and a polar functional end group such that at least a minimum concentration of 0.35 pph of said agent is present on said particles during said drying step so that said closed edges of said layer planes remain substantially closed and the exposure of acid intercalant therebetween is essentially avoided.

2. A process as defined in claim 1 wherein said agent is a surfactant with a molecular structure having a hydrophobic long chain hydrocarbon group of between $C_{10}$–$C_{30}$ carbon atoms and a polar functional end group which can be anionic, cationic, zwitterionic or nonionic.

3. A process as defined in claim 2 wherein said surfactant has the generic formula R(X) where R is the hydrocarbon group and X is selected from the group consisting of —COOZ, —SO$_3$Z, —NH$_2$, —NH$^+_3$, —N$^+$H$_2$C-H$_2$—COO$^-$, —N(CH$_3$)$_2$CH$_2$COO$^-$,

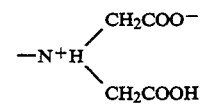

and —OH, where Z is H, an alkyl group having 1 to 6 carbon atoms, an alkali metal or NH$^+_4$.

4. A process as defined in claim 3 wherein said surfactant is insoluble in water and is added to the washed graphite particles.

5. A process as defined in claim 4 wherein the minimum concentration of said surfactant is between 0.35 pph and 1.0 pph.

6. Intercalated particles of graphite having an average titratable surface acid concentration of no greater than about 1.5% by weight and a specific worm volume of greater than about 150 cc/g when exfoliated, wherein said particles are formed by the process of treating particles of graphite with an intercalant, washing said treated particles with water, drying said graphite particles and contacting said particles of graphite, before said drying step with an effective amount of an organic molecule agent having a long chain hydrocarbon group with at least eight carbon atoms and a polar functional end group such that at least a minimum concentration of 0.35 pph of said agent is present on said particles during said drying step.

7. Intercalated particles of graphite as defined in claim 6 wherein said organic molecule agent is a surfactant composed of a hydrophobic long chain hydrocarbon group with $C_{10}$–$C_{30}$ carbon atoms and a polar functional end group which can be anionic, cationic, zwitterionic or nonionic.

* * * * *